United States Patent

Shimomura et al.

(10) Patent No.: US 12,052,384 B2
(45) Date of Patent: Jul. 30, 2024

(54) MULTIPLE DWELLING HOUSE INTERPHONE SYSTEM

(71) Applicant: Aiphone Co., Ltd., Nagoya (JP)

(72) Inventors: Yuta Shimomura, Nagoya (JP); Masashi Hattori, Nagoya (JP); Ryoji Uno, Nagoya (JP); Kimiaki Fujishima, Nagoya (JP)

(73) Assignee: Aiphone Co., Ltd., Nagoya (JP)

( * ) Notice: Subject to any disclaimer, the term of this patent is extended or adjusted under 35 U.S.C. 154(b) by 57 days.

(21) Appl. No.: 17/656,014

(22) Filed: Mar. 23, 2022

(65) Prior Publication Data

US 2022/0311869 A1    Sep. 29, 2022

(30) Foreign Application Priority Data

Mar. 29, 2021 (JP) .................................. 2021-055824

(51) Int. Cl.
*H04M 11/02* (2006.01)
*G07C 9/00* (2020.01)
(Continued)

(52) U.S. Cl.
CPC ....... *H04M 11/025* (2013.01); *G07C 9/00174* (2013.01); *G07C 9/32* (2020.01); *H04M 9/02* (2013.01)

(58) Field of Classification Search
CPC ...... H04M 11/025; H04M 9/02; H04M 11/02; G07C 9/00174; G07C 9/32; G07C 9/00; G06F 3/0484; G06F 16/9537
See application file for complete search history.

(56) References Cited

U.S. PATENT DOCUMENTS

| 10,565,531 B1* | 2/2020 | Heller | G07C 9/00896 |
| 2004/0243812 A1* | 12/2004 | Yui | G07C 9/00563 |
| | | | 713/182 |
| 2010/0024330 A1* | 2/2010 | Sodaro | G06Q 30/0281 |
| | | | 52/234 |

FOREIGN PATENT DOCUMENTS

| EP | 2 650 458 A1 | 10/2013 |
| JP | 2007-013671 A | 1/2007 |

OTHER PUBLICATIONS

Extended European Search Report dated Aug. 1, 2022 (Application No. 22163788.7).

* cited by examiner

*Primary Examiner* — Yosef K Laekemariam
(74) *Attorney, Agent, or Firm* — BURR PATENT LAW, PLLC

(57) ABSTRACT

A multiple dwelling house interphone system includes a collective entrance machine and a dwelling room master device. Each automatic door requires an unlock operation to pass through for proceeding to each area, and a part of the areas are occupied by facilities other than dwelling units. The collective entrance machine includes a card information input section, and the automatic doors each include an unlock operation section for unlocking using the card medium. The collective entrance machine further includes a card authentication section, an unlocking door storage section, and a card information storage section. The card authentication section permits the unlocking by the card medium when the information input to the card information input section matches the information registered in the card information storage section. The permitted card medium enables unlocking the automatic door stored in the unlocking door storage section in association with the information of the card medium.

5 Claims, 3 Drawing Sheets

(51) Int. Cl.
*G07C 9/32* (2020.01)
*H04M 9/02* (2006.01)

MULTIPLE DWELLING HOUSE INTERPHONE SYSTEM

BACKGROUND OF INVENTION

Technical Field

The disclosure relates to a multiple dwelling house interphone system, especially relates to a multiple dwelling house interphone system having a function of unlocking automatic doors, which are installed at a plurality of positions in a multiple dwelling house, by persons passing through.

Background Art

In a multiple dwelling house in which an automatic door is installed at an entrance, a visitor can enter a dwelling area by asking a dweller as a visit destination to unlock the automatic door from a collective entrance machine using a multiple dwelling house interphone system.

Meanwhile, there has been a multiple dwelling house in which the multiple dwelling house is divided into areas, and automatic doors including electric locks are installed at boundaries between the areas in addition to an entrance of the multiple dwelling house, thereby restricting persons entering the individual areas as a security measure. In the multiple dwelling house in which a plurality of automatic doors are installed, a collective entrance machine to perform an unlock operation is installed together with each automatic door, and the dweller or the like is asked for unlocking the automatic door at each time (see, for example, JP 2007-13671 A).

The multiple dwelling house in which a plurality of automatic doors are installed enables restricting persons allowed to enter a specific area, thus allowing to the improvement of the security.

However, since the operation to call the dweller and ask for unlocking the automatic door is required, it is burdensome for both the person passing through the automatic doors and the dweller performing the unlocking. Further, in a multiple dwelling house including a facility such as a meeting room and a gymnasium, since a person like a dweller to monitor entering persons is not always present, persons passing through the automatic door unlock the automatic door by a personal identification number or the like in the facility. In this case, it is concerned over the security since a suspicious person having obtained the unlock method can unlock the automatic door.

Therefore, it has been desired to provide a multiple dwelling house interphone system including both an improved security and a simple unlock operation.

Therefore, in consideration of the problem, it is an object of the disclosure to provide a multiple dwelling house interphone system in which a visitor or a dweller coming back home can unlock an automatic door by himself/herself to proceed to a destination or home in a multiple dwelling house including a plurality of automatic doors.

SUMMARY OF THE INVENTION

In order to solve the above-described problem, there is provided a multiple dwelling house interphone system according to a first aspect of the disclosure. The multiple dwelling house interphone system includes a collective entrance machine and a dwelling room master device. The collective entrance machine is installed at an entrance of a multiple dwelling house for calling and speaking to a dweller by a visitor. The dwelling room master device is installed in each dwelling unit for responding to the call from the collective entrance machine by the dweller. An inside of the multiple dwelling house is divided into a plurality of areas, each automatic door requires an unlock operation to pass through for proceeding to each area, and a part of the areas are occupied by facilities other than dwelling units. The collective entrance machine includes a card information input section to which at least information of card medium is input, the card medium is carried by a dweller coming back home or a facility user to unlock the automatic door, and the automatic doors each include an unlock operation section for unlocking using the card medium. The collective entrance machine further includes a card authentication section, an unlocking door storage section, and a card information storage section. The card authentication section authenticates the card medium. The unlocking door storage section stores information of combinations of the automatic doors allowed to be unlocked by the card medium, and the information is stored for each card medium. The card information storage section stores the information of the card medium associated with a dwelling unit ID set for each dwelling unit and facility. The card authentication section permits the unlocking by the card medium when the information input to the card information input section matches the information registered in the card information storage section. The permitted card medium enables unlocking the automatic door stored in the unlocking door storage section in association with the information of the card medium.

With this configuration, even when a plurality of the automatic doors are disposed, and the automatic door other than the entrance door is disposed before the visitor or the dweller coming back home reaches the destination, the automatic door to be passed can be unlocked by using the card medium authenticated by the collective entrance machine insofar as the unlocking door storage section stores information of the automatic door to be passed to proceed to the destination in association with the dwelling unit ID. Accordingly, the unlocking can be performed without a burdensome operation, for example, calling the dweller and inputting the personal identification number at each time, thus allowing smoothly proceeding to the destination.

In a second aspect of the disclosure, which is in the configuration according to the first aspect, the multiple dwelling house interphone system includes a timer section that starts counting when the card authentication section authenticates the card medium. The card authentication section cancels the permission to the unlocking by the card medium when the timer section has counted a predetermined time.

With this configuration, the card medium cannot be used unless authenticated by the collective entrance machine, and since the usable time period is set, the card medium does not effectively function even when a third person obtains the card medium.

In a third aspect of the disclosure, which is in the configuration according to the first aspect, the card information storage section registers the information of the card medium in association with information on a personal identification number, and the card information input section includes a personal identification number input section. The card authentication section permits the unlocking by the card medium when the input information of the card medium and personal identification number match the information stored in the card information storage section.

With this configuration, since it is required to input the personal identification number for validating the card medium, the high security can be maintained.

In a fourth aspect of the disclosure, which is in the configuration according to the first aspect, the unlocking door storage section stores information of combinations of the automatic doors required to be passed for proceeding to the dwelling unit or the facility. The information is stored for each dwelling unit ID or facility ID.

With this configuration, since the automatic door that can be unlocked by the card medium is limited to only the automatic door required to be passed to proceed to the dwelling unit or facility registered in the card information storage section, the security can be maintained without providing the checking function for each automatic door to be passed.

According to the disclosure, even when a plurality of the automatic doors are disposed, and the automatic door other than the entrance door is disposed before the visitor or the dweller coming back home reaches the destination, the automatic door to be passed can be unlocked by using the card medium authenticated by the collective entrance machine insofar as the unlocking door storage section stores the information of the automatic door to be passed to proceed to the destination in association with the dwelling unit ID. Accordingly, the unlocking can be performed without a burdensome operation, for example, calling the dweller and inputting the personal identification number at each time, thus allowing smoothly proceeding to the destination.

DETAILED DESCRIPTION

Figure 1:
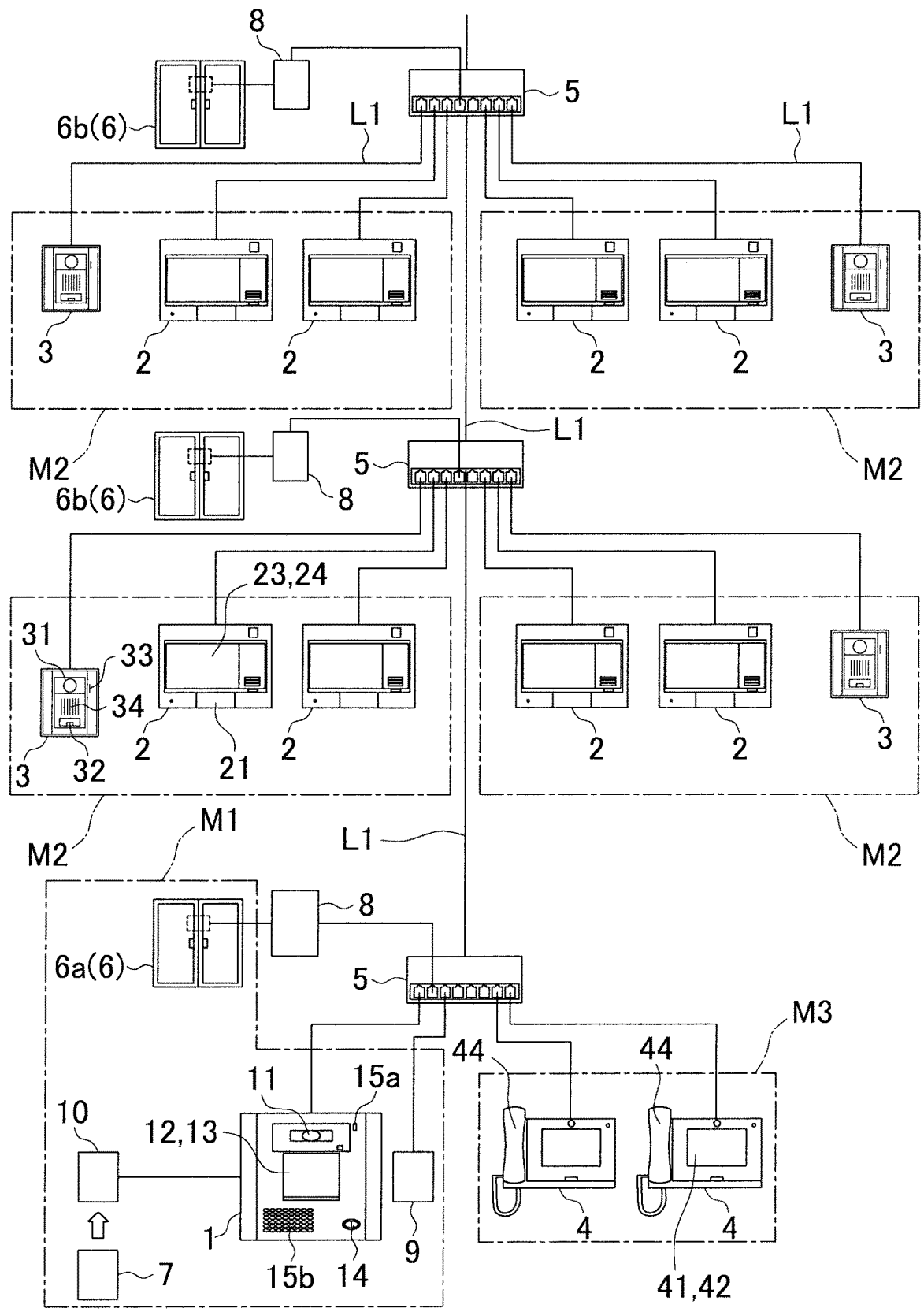
FIG. 1 is a block diagram illustrating an exemplary multiple dwelling house interphone system according to the disclosure.

The following describes embodiments in detail with reference to the drawings. FIG. 1 is a block diagram illustrating an exemplary multiple dwelling house interphone system according to the disclosure. The multiple dwelling house interphone system includes a collective entrance machine 1, dwelling room master devices 2, entrance slave devices 3, management master devices 4, and the like. The collective entrance machine 1 is installed at an entrance of a multiple dwelling house and used for calling a dweller by a visitor. The dwelling room master devices 2 are installed in individual dwelling units and used for responding to the calling from the collective entrance machine 1. The entrance slave devices 3 are installed at entrances of the individual dwelling units and used for calling the dwellers. The management master devices 4 are installed in a manager room and used for speaking with the dwellers and the like.

Reference character 6 denotes an automatic door including an electric lock, reference character 7 denotes an ID card (card medium) necessary for unlocking the automatic door 6, reference character 8 denotes an unlock operation section installed for each automatic door 6 to perform an unlock operation of the automatic door 6, reference character 9 denotes a card issuing machine that issues the ID card 7 to a user, and reference character 10 denotes a card reading section that constitutes a part of the collective entrance machine and reads information of the ID card 7.

While at least one dwelling room master device 2 is installed in the individual dwelling unit and at least one management master device 4 is installed in the manager room, a configuration in which the numbers of the installed devices are both two is indicated here. Reference character 5 denotes a HUB, and the devices are mutually connected by a LAN via communication lines L1. The communication between the devices is performed by an Internet Protocol (IP). Reference character M1 denotes an entrance of the multiple dwelling house, reference character M2 denotes a dwelling unit or a facility, and reference character M3 denotes a manager room.

Here, a multiple dwelling house in which the multiple dwelling house interphone system is installed will be briefly described. The multiple dwelling house includes a plurality of the automatic doors 6. The automatic doors 6 include an entrance door (first automatic door) 6a installed at the entrance M1 at which the collective entrance machine 1 is disposed and a plurality of automatic doors (second automatic doors) 6b installed inside the multiple dwelling house. The second automatic doors 6b divide the inside into a plurality of areas, and for entering a different area, any of the second automatic doors 6b has to be passed.

For example, a dwelling area is divided into a plurality of areas by floors or the like, and the second automatic door 6b has to be passed to enter each area.

Further, facilities other than the dwelling unit, such as a hospital and a gymnasium, are also included, and dwelling unit numbers as dwelling unit IDs are assigned to the facilities. Then, the facilities are located in the independent areas divided by the second automatic doors 6b, and the second automatic doors 6b have to be passed for entering the facilities.

Thus, a plurality of the second automatic doors 6b other than the entrance door 6a are installed, and for reaching the dwelling unit or the facility as the destination from the entrance M1 at which the collective entrance machine 1 is disposed, at least one second automatic door 6b has to be passed after passing the entrance door 6a.

Figure 2:
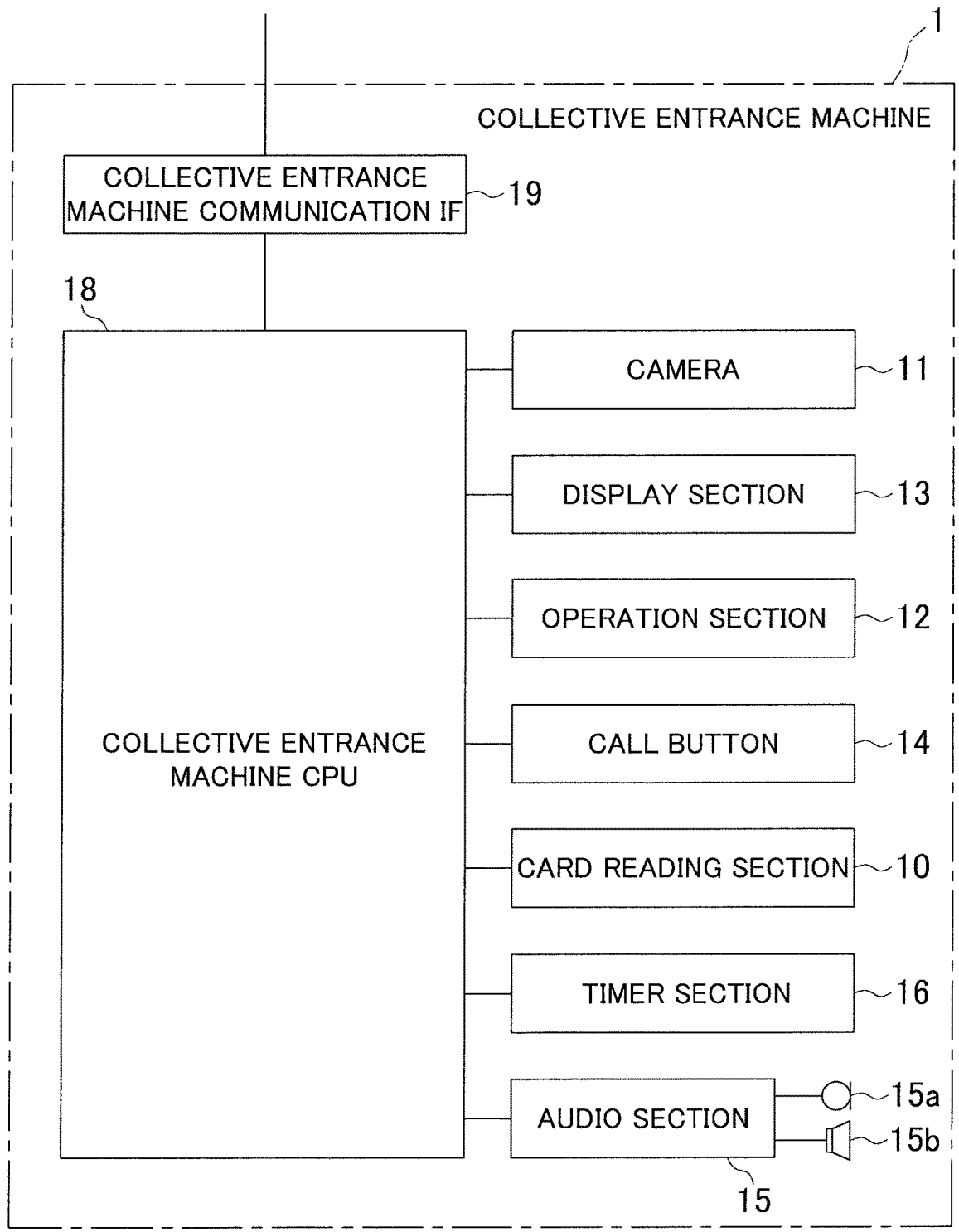
FIG. 2 is a block diagram of a collective entrance machine.

FIG. 2 is a block diagram of the collective entrance machine 1. As illustrated in FIG. 2, the collective entrance machine 1 includes the card reading section 10, a camera 11, an operation section (personal identification number input section) 12, a display section 13, a call button 14, an audio section 15, a timer section 16, a collective entrance machine CPU 18, a collective entrance machine communication IF 19, and the like. The camera 11 obtains an image of a visitor. The operation section (personal identification number input section) 12 is used for selecting or inputting a dwelling unit to be called, and further inputting a personal identification number described later. The display section 13 displays a calling destination and the like. The audio section 15 includes a microphone 15a and a speaker 15b used for speaking. The timer section 16 counts a predetermined time. The collective entrance machine CPU 18 controls the collective entrance machine 1. The collective entrance machine communication IF 19 communicates with other devices.

The collective entrance machine CPU 18 has a function as a card authentication section that authenticates the ID card from input information including information of the ID card 7 and allows the unlock operation. The card reading section 10 and the operation section 12 constitute a card information input section.

The dwelling room master device 2 includes a speech button 21, a monitor 23, an operation section 24, a microphone and a speaker, and the like. The speech button 21 is used for responding to the calling. The monitor 23 displays a video image obtained by a slave device camera 31 described later in addition to a video image obtained by the camera 11, and displays various kinds of information. The operation section 24 includes a touch panel and is integrated with the monitor 23. The microphone and the speaker are used for speaking.

The entrance slave device 3 includes the slave device camera 31 for obtaining an image of a visitor, a call button 32, a microphone 33 and a speaker 34 used for speaking, and the like.

The management master device 4 includes a monitor 41, an operation section 42, a handset 44, and the like. The monitor 41 displays the video image obtained by the camera 11, and displays various kinds of information. The operation section 42 includes a touch panel and is integrated with the monitor 41. The handset 44 is used for speaking.

Figure 3:
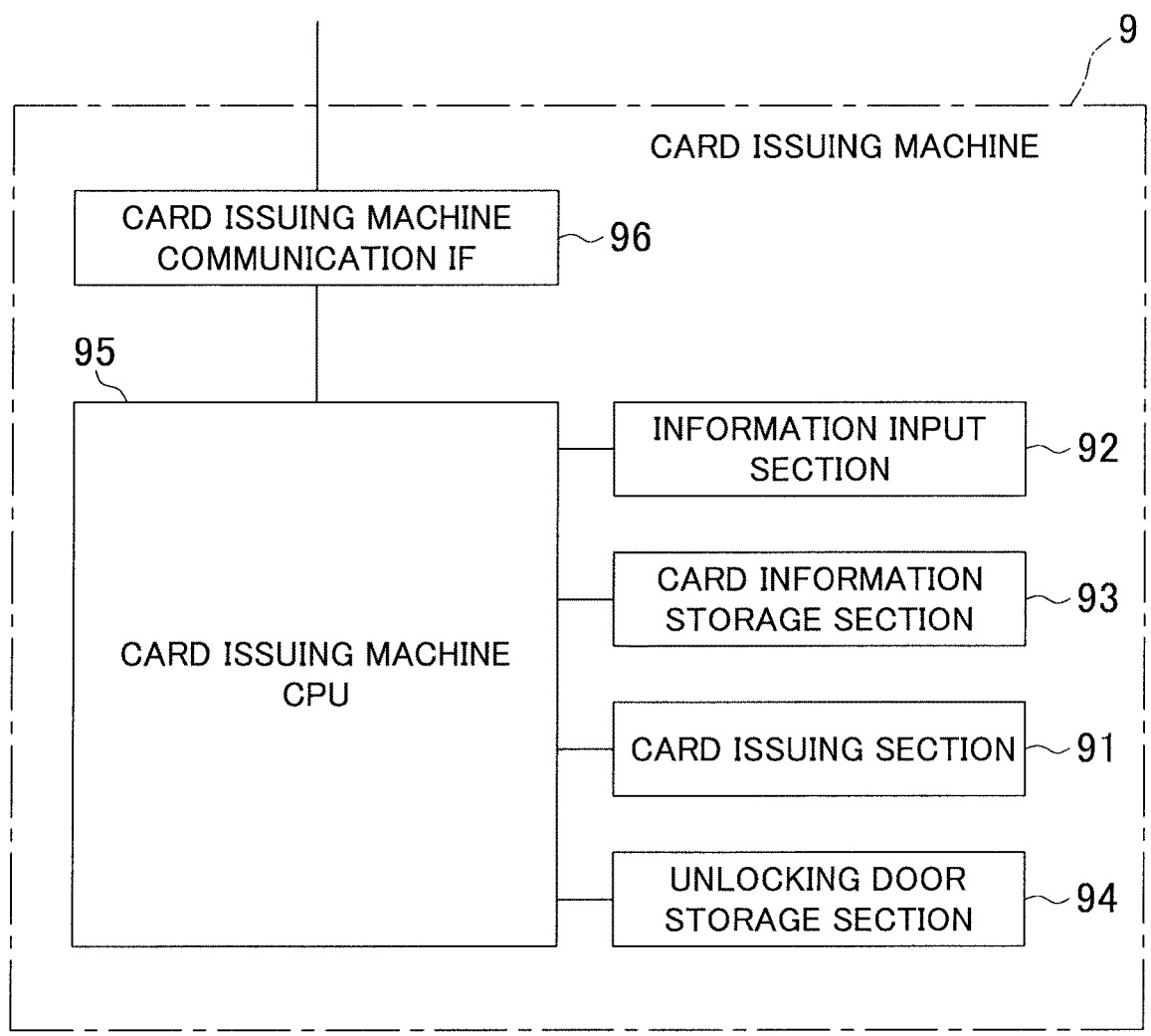
FIG. 3 is a block diagram of a card issuing machine.

FIG. 3 is a block diagram of the card issuing machine 9. As illustrated in FIG. 3, the card issuing machine 9 includes a card issuing section 91, an information input section 92, a card information storage section 93, an unlocking door storage section 94, a card issuing machine CPU 95, a card issuing machine communication IF 96, and the like. The card issuing section 91 issues the ID card 7. The information input section 92 includes a numeric keypad or the like to input information on an issue target person (carrier). The card information storage section 93 stores the information input from the information input section 92 and information registered in the issued ID card 7 in association with one another. The unlocking door storage section 94 stores information of combinations of the second automatic doors 6b required to be passed for proceeding from the entrance M1 to the dwelling unit or the facility. The information of the combinations of the second automatic doors 6b is stored for each dwelling unit or facility. The card issuing machine CPU 95 controls the card issuing machine 9. The card issuing machine communication IF 96 communicates with the collective entrance machine 1 and the like.

For the ID card 7, for example, a card on which a barcode or a QR code (registered trademark) is printed, a magnetic, or the like is usable, and an IC card may be used. It should be noted that the card reading section 10 of the collective entrance machine 1 includes reading unit differed depending on the form of the ID card to be used. For example, an image information input section including a camera is disposed in a case of using the QR code (registered trademark), and a magnetic information input section is disposed in a case of using a magnetic card.

Operations of the multiple dwelling house interphone system configured as described above are as follows. However, it should be noted that the following operations and the like are similar to those in the conventional system, and therefore, their explanations are omitted. One operation is that a call to a dweller is performed by operating the collective entrance machine 1 and the dwelling room master device 2 of the dwelling unit as the calling destination emits a call sound. Another operation is that a speech path is formed when a response operation is performed by the dwelling room master device 2 in response to the call. Another operation is that a video image taken by the camera 11 is transmitted in accordance with the call and displayed on the monitor 23 of the dwelling room master device 2. The other operation is that the entrance door 6a is unlocked when the unlock button of the dwelling room master device is operated in response to the call.

Here, a control that allows unlocking the automatic door 6 without calling the dweller for proceeding to the dwelling unit or the facility as the destination by using the ID card 7 will be mainly described.

First, a procedure of issuing the ID card 7 will be described. A case where the ID card 7 is a magnetic card will be described here. The ID card 7 is issued by the card issuing machine 9, and issued by inputting the dwelling unit number of the dweller or a facility number (dwelling unit number) of the facility as a target of the user and the personal identification number to the information input section of the card issuing machine 9.

The personal identification number is preliminarily set by the dweller and a facility user as a visitor, and registered in the card information storage section together with the dwelling unit number from the dwelling room master device 2 or the like.

The card issuing machine 9 receiving the input of the dwelling unit number and the personal identification number checks them against the stored personal identification number to authenticate the person, and issues the ID card 7 when they are matched. The information of the issued ID card 7 is registered in the card information storage section 93 while associating the personal identification number with the dwelling unit number.

The issued ID card 7 continues to be used thereafter.

The dweller carries the ID card 7 issued as above-described when leaving home, and the facility user carries it when using the facility. Then, the dweller or the facility user causes the card reading section 10 of the collective entrance machine 1 installed at the entrance M1 to read the information of the ID card 7 when coming back home or visiting the facility, and operates the operation section 12 to input the personal identification number.

After checking the input personal identification number, the collective entrance machine CPU 18 reads the information of the read ID card 7 and the associated dwelling unit number from the card information storage section 93 of the card issuing machine 9, unlocks the entrance door 6a, and permits unlocking the second automatic doors 6b present before reaching the position having the dwelling unit number registered in the card information storage section 93. A message, for example, "your card is authenticated, please come in" is emitted from the collective entrance machine.

Simultaneously, the timer section 16 is turned on to start counting a predetermined time, such as one hour, and the use of the ID card 7 is permitted until the predetermined time is elapsed.

The dweller coming back home or the facility user passing the entrance door 6a to enter the dwelling area unlocks the second automatic doors 6b present before reaching the dwelling unit or the facility as the destination by causing the unlock operation sections 8 of the second automatic doors 6b to read the information of the ID card 7. The information read by the unlock operation section 8 is transmitted to the collective entrance machine 1, and when the collective entrance machine CPU 18 determines that the second automatic door 6b is the automatic door 6 registered in the unlocking door storage section 94 in association with the information of the read ID card 7 and the predetermined time has not been elapsed yet, a permission signal is sent back, and the second automatic door 6b is unlocked.

Thus, even when a plurality of the second automatic doors 6b are present on the way, the second automatic doors 6b can be unlocked by using the ID card 7, the dweller can proceed to his/her own dwelling unit, and the facility user can proceed to the facility as the destination.

Meanwhile, the second automatic door 6b not registered in the unlocking door storage section 94 is not unlocked since the collective entrance machine CPU 18 does not permit the unlocking, and when the predetermined time is elapsed, the permission is cancelled and the use of the ID card 7 is disabled.

As described above, even when a plurality of the automatic doors 6 are disposed in the multiple dwelling house, and the second automatic door 6b other than the entrance door 6a is disposed before the visitor or the dweller coming back home reaches the destination, the automatic door 6 can be easily unlocked by using the ID card 7 authenticated by the collective entrance machine 1. Accordingly, the second automatic door 6b can be unlocked without calling the dweller to ask the unlocking and inputting the personal identification number at each time, thus allowing smoothly proceeding to the destination.

Since the ID card 7 is permitted to be used in the limited period, even when a third person obtains the ID card 7, it does not effectively function.

Further, since the second automatic door 6b that can be unlocked by the ID card 7 is limited to the second automatic door 6b required to be passed for proceeding to the dwelling unit or facility registered in the card information storage section 93, the security can be maintained without calling the dweller to ask the unlocking.

While the ID card 7 is issued to and carried by the dweller or the facility user in the above-described embodiment, the ID card 7 may be image information such as a barcode or a QR code (registered trademark) and registered as an image in a mobile phone such as a smartphone, and the image may be used as the ID card.

While the multiple dwelling house interphone system has a configuration in which the communication between the devices is performed by the IP communication, the technique of the disclosure is applicable to a conventional configuration in which a controller to control the communication between the devices is disposed and the devices are mutually connected by a two-wire transmission line.

Further, in the authentication of the ID card 7 by the collective entrance machine 1, inputting the personal identification number may be omitted.

The invention claimed is:

1. A multiple dwelling house interphone system comprising:
   a collective entrance machine for a visitor to call and speak to a dweller, the collective entrance machine being installed at an entrance of a multiple dwelling house, the multiple dwelling house including a plurality of divided areas, the plurality of divided areas including areas having dwelling units, and at least a part of the plurality of divided areas including facilities other than dwelling units;
   a dwelling room master device installed in each dwelling unit for a dweller to respond to a call from the collective entrance machine;
   a first automatic door installed at the entrance; and
   a plurality of second automatic doors located between each of the plurality of divided areas,
   wherein after passing through the first automatic door from the entrance where the collective entrance machine is located, at least one of the plurality of second automatic doors is passed in order to reach the areas having the plurality of dwelling units or the areas having facilities other than dwelling units,
   wherein each automatic door requires an unlock operation to pass through to each of the plurality of divided areas,
   wherein the collective entrance machine includes a card information input section to which at least information of card medium is input, the card medium is carried by a dweller coming back home or a facility user to unlock the automatic door, and the automatic doors each include an unlock operation section for unlocking using the card medium,
   wherein the collective entrance machine further includes
      a card authentication section that authenticates the card medium,
      a timer section that starts counting when the card authentication section authenticates the card medium,
      an unlocking door storage section that stores information of combinations of the automatic doors required to be passed to proceed to the dwelling unit or facility to be unlocked by the card medium, the information being stored for each card medium, and
      a card information storage section that stores the information of the card medium associated with a dwelling unit ID set for each dwelling unit and facility, so that the automatic doors that can be unlocked by the card medium are limited to only the automatic doors required to be passed to proceed to the dwelling unit or the facility registered in the card information system,
   wherein the card authentication section permits the unlocking by the card medium when the information input to the card information input section matches the information registered in the card information storage section,
   wherein the permitted card medium enables unlocking the automatic door stored in the unlocking door storage section in association with the information of the card medium, and
   wherein the card authentication section cancels the permission for the unlocking by the card medium when the timer section has counted a predetermined time, whereby it becomes impossible to unlock the previously permitted automatic doors with the card medium.

2. The multiple dwelling house interphone system according to claim 1, wherein the card information storage section registers the information of the card medium in association with information on a personal identification number, and the card information input section includes a personal identification number input section, and
   wherein the card authentication section permits the unlocking by the card medium when the input information of the card medium and personal identification number match the information stored in the card information storage section.

3. The multiple dwelling house interphone system according to claim 1, wherein the information stored in the unlocking door storage section is stored for each dwelling unit ID or facility ID.

4. The multiple dwelling house interphone system according to claim 1, wherein the card information storage section registers the information of the card medium in association with information on a personal identification number, and the card information input section includes a personal identification number input section, and
   wherein the card authentication section permits the unlocking by the card medium when the input information of the card medium and personal identification number match the information stored in the card information storage section.

5. The multiple dwelling house interphone system according to claim 2, wherein the information stored in the unlocking door storage section is stored for each dwelling unit ID or facility ID.

* * * * *